United States Patent
Daiki et al.

(10) Patent No.: US 11,407,638 B2
(45) Date of Patent: Aug. 9, 2022

(54) HEXAGONAL BORON NITRIDE POWDER AND PRODUCTION PROCESS THEREFOR

(71) Applicant: TOKUYAMA CORPORATION, Shunan (JP)

(72) Inventors: Shota Daiki, Shunan (JP); Kyoichi Fujinami, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 59 days.

(21) Appl. No.: 16/473,317

(22) PCT Filed: Dec. 12, 2017

(86) PCT No.: PCT/JP2017/044607
§ 371 (c)(1),
(2) Date: Jun. 25, 2019

(87) PCT Pub. No.: WO2018/123571
PCT Pub. Date: Jul. 5, 2018

(65) Prior Publication Data
US 2019/0352180 A1 Nov. 21, 2019

(30) Foreign Application Priority Data
Dec. 26, 2016 (JP) .............................. JP2016-250765

(51) Int. Cl.
*C01B 21/064* (2006.01)
*C08K 3/22* (2006.01)
(Continued)

(52) U.S. Cl.
CPC ........ *C01B 21/0645* (2013.01); *C01B 21/064* (2013.01); *C08K 3/22* (2013.01);
(Continued)

(58) Field of Classification Search
CPC ............... C01B 21/064; C01B 21/0645; C01P 2004/51; C01P 2006/11; C01P 2006/12; C01P 2006/80
See application file for complete search history.

(56) References Cited

U.S. PATENT DOCUMENTS 4,642,298 A * 2/1987 Kuramoto ............. C04B 35/583
501/96.4
6,048,511 A * 4/2000 Shaffer ............... C04B 35/5831
264/117
(Continued)

FOREIGN PATENT DOCUMENTS

JP 11-26661 A 1/1999
JP 2011-98882 A 5/2011
(Continued)

OTHER PUBLICATIONS

Translation of JP2016160134, publication date Sep. 5, 2016.*
(Continued)

*Primary Examiner* — Jun Li
(74) *Attorney, Agent, or Firm* — Birch, Stewart, Kolasch & Birch, LLP (57) ABSTRACT

To provide a hexagonal boron nitride powder which contains agglomerates, has a maximum torque calculated by measuring in accordance with JIS-K-6217-4 of 0.20 to 0.50 Nm, a DBP absorption rate of 50 to 100 ml/100 g, a tap bulk density of 0.66 to 0.95 g/cm$^3$ and reduced anisotropy of heat conduction and can provide high heat conductivity and dielectric strength to a resin composition produced by filling a resin therewith and a process for producing the powder by carrying out a reduction nitriding reaction using boron carbide.

8 Claims, 2 Drawing Sheets

(51) Int. Cl.
   *C08K 3/28*   (2006.01)
   *C08K 3/38*   (2006.01)

(52) U.S. Cl.
   CPC ...... *C01P 2002/70* (2013.01); *C01P 2004/51* (2013.01); *C01P 2006/11* (2013.01); *C01P 2006/12* (2013.01); *C01P 2006/32* (2013.01); *C01P 2006/80* (2013.01); *C08K 2003/2227* (2013.01); *C08K 2003/282* (2013.01); *C08K 2003/385* (2013.01); *C08K 2201/005* (2013.01); *C08K 2201/006* (2013.01)

(56) References Cited

U.S. PATENT DOCUMENTS

| | | | |
|---|---|---|---|
| 6,541,111 B2* | 4/2003 | Fauzi | B82Y 30/00 423/290 |
| 8,679,429 B2 | 3/2014 | Gohara et al. | |
| 2012/0196128 A1 | 8/2012 | Gohara et al. | |
| 2015/0337145 A1* | 11/2015 | Torrisi | C09D 11/322 428/207 |
| 2016/0325994 A1* | 11/2016 | Qu | C01B 21/0648 |
| 2016/0333246 A1 | 11/2016 | Tatami et al. | |

FOREIGN PATENT DOCUMENTS

| | | |
|---|---|---|
| JP | 2015-212217 A | 11/2015 |
| JP | 2016-94315 A | 5/2016 |
| JP | 2016-115808 A | 6/2016 |
| JP | 2016-160134 A | 9/2016 |
| WO | WO 2005/021428 A1 | 3/2005 |
| WO | WO 2011/043082 A1 | 4/2011 |
| WO | WO 2015/105145 A1 | 7/2015 |
| WO | WO 2016/092951 A1 | 6/2016 |

OTHER PUBLICATIONS

Machine translation of Fukasawa—WO2016092951A, publication date Jun. 16, 2016.*
International Preliminary Report on Patentability and English Translation of Written Opinion of the International Searching Authority, dated Jul. 2, 2019, issued in PCT/JP2017/044607 (Forms PCT/IB/373 and PCT/ISA/237).
Extended European Search Report, dated Jul. 15, 2020, for corresponding European Application No. 17888869.9.
Taiwanese Office Action dated Aug. 4, 2021 for corresponding Taiwanese Patent Application No. 106144329, with English translation.
International Search Report for PCT/JP2017/044607 (PCT/ISA/210) dated Feb. 20, 2018.

* cited by examiner

HEXAGONAL BORON NITRIDE POWDER AND PRODUCTION PROCESS THEREFOR

TECHNICAL FIELD

The present invention relates to a novel hexagonal boron nitride powder and a production process therefor. More specifically, it relates to a hexagonal boron nitride powder which can provide high heat conductivity and dielectric strength to a resin composition obtained by filling a resin therewith and to a production process therefor.

BACKGROUND ART

A hexagonal boron nitride powder is generally a white powder having the same hexagonal layer structure as graphite and has many characteristic properties such as high heat conductivity, high electric insulation property, high lubricity, corrosion resistance, releasability, high-temperature stability and chemical stability. Therefore, a resin composition filled with this hexagonal boron nitride powder is advantageously used as a heat-conductive insulating sheet by molding.

The hexagonal boron nitride powder contains primary particles composed of scaly particles derived from its crystal structure, and the scaly particles have thermal anisotropy. In general, in the case of a heat-conductive insulating sheet comprising as a filler the above boron nitride powder containing scaly particles as single particles, as the scaly particles are oriented in the plane direction of the heat-conductive insulating sheet, heat is transmitted in the c-axis direction having low heat conductivity of each of the scaly particles with the result that the heat conductivity in the thickness direction of the heat-conductive insulating sheet is low.

To improve the thermal anisotropy of the hexagonal boron nitride particles having the scaly structure, there is proposed a hexagonal boron nitride powder containing hexagonal boron nitride agglomerates (refer to Patent Document 1).

Meanwhile, in the process of producing a heat-conductive insulating sheet by filling a thermosetting resin with a hexagonal boron nitride powder, a method in which the hexagonal boron nitride powder is mixed with an uncured curable resin and a curing agent in an organic solvent and then the mixture is coated to a predetermined thickness and cured under pressure to increase filling density is generally employed.

To provide high heat conductivity to the heat-conductive insulating sheet in the above process, not less than 60 vol % of the hexagonal boron nitride powder needs to be filled in the above resin composition. To enable the resin and the above amount of the hexagonal boron nitride powder to be dispersed uniformly in the above mixture and secure viscosity which enables coating in the step of coating the mixture, a method in which the hexagonal boron nitride powder, the resin and the curing agent are dispersed in a diluent solvent and mixed together to obtain a varnish-like composition is generally employed.

However, a conventionally proposed hexagonal boron nitride powder which contains hexagonal boron nitride agglomerates has problems that the number of relatively large open pores in each agglomerate is large and the DBP (dibutyl phthalate) absorption rate which indicates the degree of a structure on the surface of each agglomerate tends to be large. When the absorption amount increases, the required amount of the diluent solvent used at the time of filling the resin tends to become large. Although the above diluent solvent is volatilized in a post-process and does not remain in a heat-conductive insulating sheet, it takes time to dry it after coating. After the diluent solvent is dried, voids are formed between particles constituting agglomerated particles and may remain as fine bubbles in the heat-conductive insulating sheet in the defoaming step, which causes the reduction of heat conductivity and dielectric strength.

When the content of single particles in the hexagonal boron nitride powder is high, the DBP absorption rate may become small and viscosity may become high when the resin is filled with the hexagonal boron nitride powder. In addition, a hexagonal boron nitride powder having a high content of single particles has low tap bulk density as the single particles are plate-like and not spherical, thereby deteriorating resin filling property with the result that, when a heat-conductive insulating sheet is produced, the filler is not in a most densely filled state in the sheet. Therefore, at the time of press molding, an excessive load is applied to the hexagonal boron nitride agglomerates, whereby the agglomerates may be broken. Further, as the single particles are easily oriented in a plane direction having low heat conductivity, it is difficult to obtain high heat conductivity.

PRIOR ART DOCUMENTS

Patent Document

Patent Document 1: JP-A 2011-98882

DISCLOSURE OF THE INVENTION

Problem to be Solved by the Invention

It is therefore an object of the present invention to provide a hexagonal boron nitride powder containing the above hexagonal boron nitride agglomerates, which is easily filled into a resin, can reduce the amount of a solvent required for the production of a varnish-like composition, exhibits high heat conductivity when it is filled into a resin, rarely has relatively large voids having an adverse effect on dielectric strength and can provide high dielectric strength to a resin composition.

It is another object of the present invention to provide a hexagonal boron nitride powder which meets the requirements for low maximum torque, small DBP absorption rate and high tap bulk density at the same time.

It is still another object of the present invention to provide a novel process for producing a hexagonal boron nitride powder having the above characteristic properties.

Other objects and advantages of the present invention will become apparent from the following description.

Means for Solving the Problems

According to the present invention, firstly, the above objects and advantages of the present invention are attained by a hexagonal boron nitride powder which contains hexagonal boron nitride agglomerates and has a maximum torque of 0.20 to 0.50 Nm, a DBP absorption rate of 50 to 100 ml/100 g and a tap bulk density of 0.66 to 0.95 g/cm$^3$, wherein the maximum torque and the DBP absorption rate are calculated by measuring in accordance with JIS-K-6217-4.

According to the present invention, secondly, the above objects and advantages of the present invention are attained by a process for producing a hexagonal boron nitride powder, comprising the steps of:

mixing together an oxygen-containing boron compound, a carbon source, an oxygen-containing calcium compound and boron carbide to ensure that the B/C ratio (elemental ratio) of B contained in the oxygen-containing boron compound to C contained in the carbon source becomes 0.75 to 1.05, the amount of the oxygen-containing calcium compound becomes 5 to 20 parts by mass in terms of CaO based on 100 parts by mass of the total in terms of $B_2O_3$ of the oxygen-containing boron compound and C of the carbon source, and the amount of the boron carbide becomes 10 to 45 parts by mass based on 100 parts by mass of the total in terms of $B_2O_3$, C and CaO of the oxygen-containing boron compound, the carbon source and the oxygen-containing calcium compound, respectively; and heating the mixture in a nitrogen atmosphere at 1,700 to 2,100° C. to reduction nitride it.

Preferably, the above hexagonal boron nitride powder of the present invention has a specific surface area of 1.31 to 7.0 $m^2/g$.

Preferably, the above hexagonal boron nitride powder of the present invention has a particle diameter at a cumulative volume frequency of 90% in particle size distribution measured by a laser diffraction particle size distribution method of 50 to 150 μm.

Preferably, the above hexagonal boron nitride powder of the present invention has a boron nitride purity of not less than 99.95%.

Further, the present invention provides a resin filler composed of the above boron nitride powder, a resin composition filled with the resin filler, a resin composition filled with the hexagonal boron nitride powder and at least one of aluminum nitride and aluminum oxide, and a heat radiation material for electronic parts comprising the above resin composition.

The hexagonal boron nitride powder of the present invention can be advantageously produced by mixing together an oxygen-containing boron compound, a carbon source, an oxygen-containing calcium compound and boron carbide to ensure that the B/C ratio (elemental ratio) of B contained in the oxygen-containing boron compound to C contained in the carbon source becomes 0.75 to 1.05, the amount of the oxygen-containing calcium compound becomes 5 to 20 parts by mass in terms of CaO based on 100 parts by mass of the total in terms of $B_2O_3$ of the oxygen-containing boron compound and C of the carbon source, and the amount of the boron carbide becomes 10 to 45 parts by mass based on 100 parts by mass of the total in terms of $B_2O_3$, C and CaO of the oxygen-containing boron compound, the carbon source and the oxygen-containing calcium compound, respectively, and heating the mixture in a nitrogen atmosphere at 1,800 to 2,100° C. to reduction nitride it.

According to the above process, the hexagonal boron nitride powder containing hexagonal boron nitride agglomerates of the present invention can be directly produced by a reduction nitriding method.

Effect of the Invention

Since the hexagonal boron nitride powder of the present invention contains hexagonal boron nitride agglomerates having a very dense agglomeration structure as described above, it is hexagonal boron nitride having a low maximum torque, a large number of openings in the surfaces of the agglomerates and a high degree of the growth of a structure all of which distinguish the powder from a hexagonal boron nitride powder containing single particles as the main component, a low DBP absorption rate which distinguishes the powder from a hexagonal boron nitride powder containing agglomerated particles having a low agglomeration density, and a high tap bulk density which distinguishes the powder from a hexagonal boron nitride powder containing single particles as the main component or a hexagonal boron nitride powder containing agglomerated particles having a low agglomeration density at the same time.

Since the hexagonal boron nitride powder of the present invention has a smaller DBP absorption rate than that of a hexagonal boron nitride powder containing hexagonal boron nitride agglomerates in a general agglomerated state, the amount of a solvent for obtaining a varnish-like composition can be reduced to the minimum value and the number of fine voids formed in a resin can be reduced when the solvent is defoamed in the post-process. Therefore, not only high dielectric strength can be provided to the obtained resin composition but also labor for removing the solvent can be reduced.

Since the maximum torque calculated by measuring in accordance with JIS-K-6217-4 is stably lower than that of a conventional hexagonal boron nitride powder containing hexagonal boron nitride agglomerated particles, a rise in viscosity can be effectively suppressed when the hexagonal boron nitride powder is filled into a resin.

Further, ordinary boron nitride agglomerates do not have a high tap bulk density due to voids in the agglomerate, the shape anisotropy of the agglomerates and an inappropriate particle size distribution. However, the boron nitride powder of the present invention has high resin filling property with a tap bulk density of 0.66 to 0.95 $g/cm^3$ and hexagonal boron agglomerates are existent in close contact with one another when a heat-conductive insulating sheet is produced, thereby making it possible to secure a good heat path so as to provide high heat conductivity to the obtained heat-conductive insulating sheet.

According to a process for producing the hexagonal boron nitride powder of the present invention, when the oxygen-containing boron compound, carbon source, oxygen-containing calcium compound and boron carbide are used, a hexagonal boron nitride powder containing hexagonal boron nitride agglomerates and having the targeted small DBP absorption rate, maximum torque and high tap bulk density can be produced directly by a reduction nitriding method.

In the above production process, the reason that the hexagonal boron nitride powder containing hexagonal boron nitride agglomerates of the present invention is obtained is considered as follows. That is, it is considered that a reduction nitriding reaction (1) represented by a reaction formula (1) which will be described hereafter takes place among the oxygen-containing boron compound, the carbon source and a nitrogen gas, and then a reaction (reaction formula (2)) in which boron carbide is directly nitrided, the reduction nitriding reaction (1) again and reactions (3) and (4) occur concertedly by using C by-produced as a reduction agent by the reaction of the reaction formula (2). Since the particle diameter of hexagonal boron nitride produced from the reactions (2), (3) and (4) in which boron carbide is involved, correlates with the particle diameter of raw material boron carbide at this point, hexagonal boron nitride having a large particle diameter can be produced efficiently. C released while boron carbide is nitrided from the surface accumulates on the surface of large-diameter hexagonal boron nitride derived from boron carbide to produce a hexagonal boron nitride agglomerate when boron oxide is reduction nitride to become hexagonal boron nitride. Although the above agglomerate is an agglomerate, since the particle boundary of primary particles is hardly discriminated and there are a small number of open pores, it differs from hexagonal boron nitride agglomerated particles having voids whose primary particles are easily recognized like hexagonal boron nitride agglomerated particles produced by a conventional technology. As described above, by adjusting the particle diameter and amount of each raw material, the above small DBP absorption rate, maximum torque and high tap bulk density can be obtained at the same time. By using the above process, the hexagonal boron nitride powder containing hexagonal boron nitride agglomerates of the present invention can be provided by a one-time baking step.

$$B_2O_3 + 3C + N_2 \rightarrow 2BN + 3CO \quad (1)$$

$$B_4C + N_2 \rightarrow 4BN + C \quad (2)$$

$$B_4C + B_2O_3 + 7N_2 \rightarrow 14BN + 3CO \quad (3)$$

$$B_4C + 2B_2O_3 + 5C + 4N_2 \rightarrow 8BN + 6CO \quad (4)$$

According to the production process of the present invention, by controlling the particle diameter of the raw material boron carbide, the obtained hexagonal boron nitride powder can have a particle diameter at a cumulative volume frequency of 90% in particle size distribution measured by a laser diffraction particle size distribution method of 50 to 150 μm which is appropriate as boron nitride agglomerates for a heat-conductive insulating sheet. Since large-diameter boron nitride agglomerates are existent in close contact with one another in the heat-conductive insulating sheet and a good heat path can be secured, high heat conductivity can be provided to the heat-conductive insulating sheet.

Figure 1:
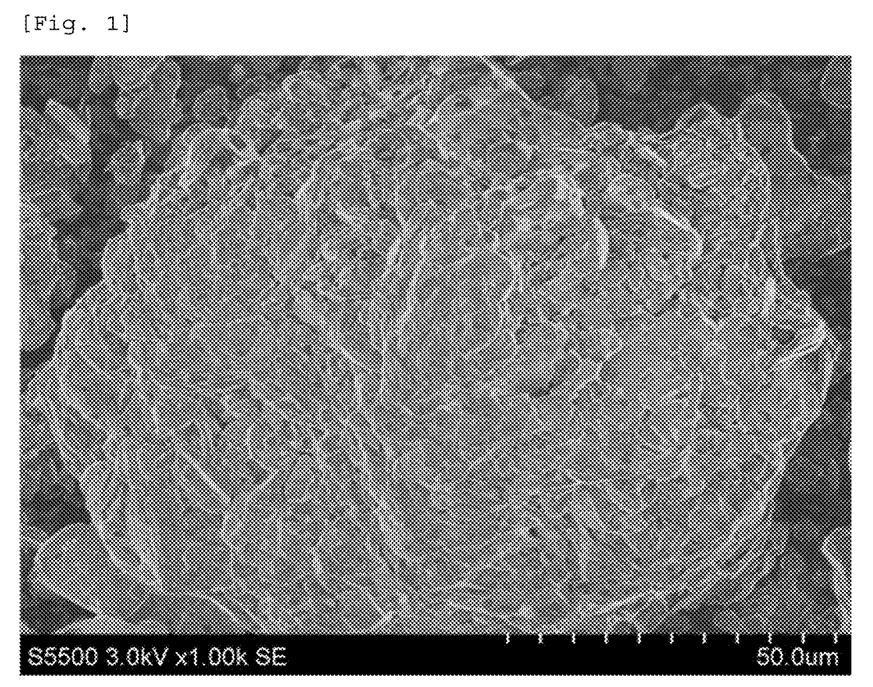
FIG. 1. This shows a SEM observed image of hexagonal boron nitride agglomerated particles obtained in Example 1.
Figure 2:
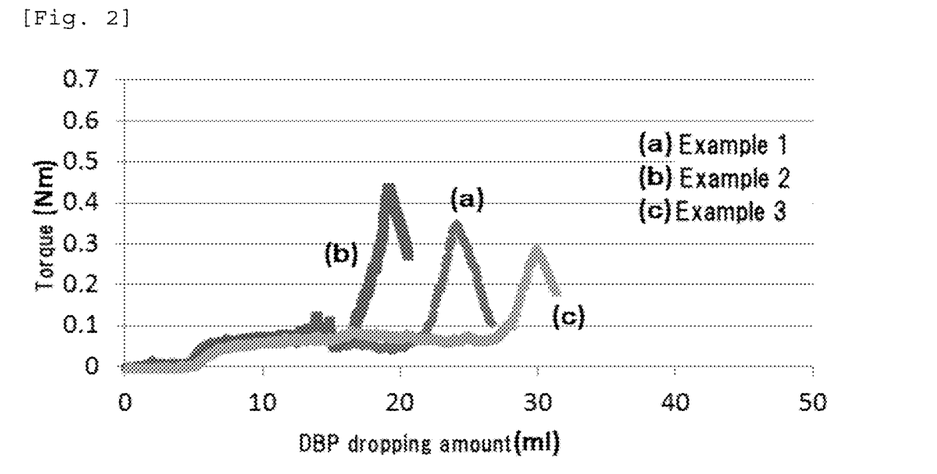
FIG. 2. This shows curves indicating the relationship between the dropping amount of DBP (ml) and torque (Nm) measured in accordance with JIS-K-6217-4 of hexagonal boron nitride powders obtained in Examples 1 to 3.
Figure 3:
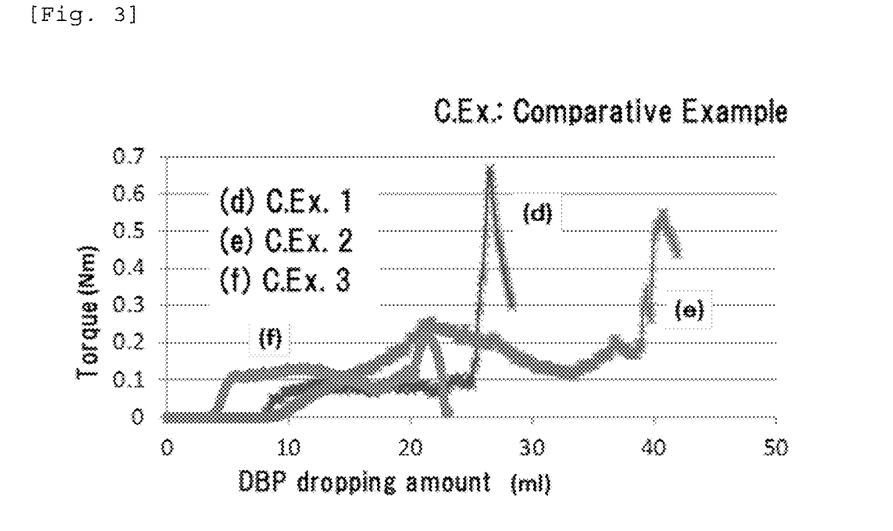
FIG. 3. This shows curves indicating the relationship between the dropping amount of DBP (ml) and torque (Nm) measured in accordance with JIS-K-6217-4 of hexagonal boron nitride powders obtained in Comparative Examples 1 to 3.

PRACTICAL EMBODIMENT OF THE INVENTION (Hexagonal Boron Nitride Powder)

The hexagonal boron nitride powder of the present invention is characterized in that it contains hexagonal boron nitride agglomerates and has a maximum torque calculated by measuring in accordance with JIS-K-6217-4 of 0.20 to 0.50 Nm, a DBP absorption rate of 50 to 100 ml/100 g and a tap bulk density of 0.66 to 0.95 g/cm³.

As for the identification of the hexagonal boron nitride, a sample powder is identified as the hexagonal boron nitride powder when it is confirmed that there is no assigned peak except for hexagonal boron nitride in X-ray diffraction measurement. For the above X-ray diffraction measurement, the SmartLab (trade name), fully automatic horizontal type multi-purpose X-ray diffraction apparatus of Rigaku Corporation, was used. The measurement conditions include a scanning speed of 20°/min, a step width of 0.02° and a scanning range of 10 to 90°.

The maximum torque calculated by measuring in accordance with JIS-K-6217-4 is calculated from a curve plotting the DBP dropping amount (ml) as the horizontal axis and torque (Nm) as the vertical axis, and the DBP absorption rate is calculated from a DBP dropping amount at a torque of 70% of the maximum torque. The above measurement can be made by using the S-500 (trade name) of Asahisouken Corporation.

Further, in the present invention, the tap bulk density of the hexagonal boron nitride powder can be measured with the KYT-5000 (trade name) tap denser of Seishin Enterprise Co., Ltd. as shown in Examples which will be given hereinafter.

The above maximum torque of the hexagonal boron nitride powder of the present invention is 0.20 to 0.50 Nm, preferably 0.20 to 0.45 Nm. The above maximum torque range shows that the hexagonal boron nitride powder contains agglomerated particles whose content is high and has a relatively wide particle size distribution. When the maximum torque is higher than 0.50 Nm, the ratio of single particles having a single diameter becomes high, and viscosity tends to become high at the time of filling a resin with the hexagonal boron nitride powder. It is difficult to produce a hexagonal boron nitride powder having a maximum torque of less than 0.20 Nm.

By the way, the maximum torque of a hexagonal boron nitride power containing single particles having a single diameter as the main component is at least about 0.6 Nm and generally 0.6 to 0.75 Nm.

The DBP absorption rate of the hexagonal boron nitride powder of the present invention is 50 to 100 ml/100 g, preferably 50 to 80 ml/100 g, more preferably 50 to 75 ml/100 g. That is, the above DBP absorption rate shows the number of open pores in each of the agglomerated particles and the state of a structure on the surface of the particle out of the characteristic properties of the hexagonal boron nitride powder. As the number of open pores is larger and the structure grows more, the above DBP absorption rate becomes larger. A conventional hexagonal boron nitride powder containing agglomerated particles has a DBP absorption rate of more than 100 ml/100 g and requires an extremely large amount of a diluent solvent at the time of filling a resin. Therefore, fine voids remain in a heat-conductive insulating sheet due to removal by volatilization in the post-process, whereby the reduction of the heat conductivity and dielectric strength of the obtained molded body is concerned. Further, when the DBP absorption rate is larger than 100 ml/100 g, viscosity may rise at the time of filling a resin. In contrast to this, though the hexagonal boron nitride powder of the present invention contains agglomerated particles, the number of openings in the surface of each agglomerate is small, the degree of the growth of a structure is low, and agglomeration is dense, whereby the DBP absorption rate is not more than 100 ml/100 g and the above problems at the time of filling a resin can be solved.

As the above DBP absorption rate is smaller, the required amount of the above diluent solvent becomes smaller, thereby easily obtaining an effect. However, it is difficult to produce a hexagonal boron nitride powder having a DBP absorption rate of less than 50 ml/100 g.

Further, the tap bulk density of the hexagonal boron nitride powder of the present invention is 0.66 to 0.95 g/cm³, preferably 0.66 to 0.90 g/cm³, more preferably 0.73 to 0.88 g/cm³. The above tap bulk density is an index of the number of open pores, the shape of each particle and the width of a particle size distribution out of the characteristic properties of the hexagonal boron nitride powder. A high value of the tap bulk density means that the number of open pores is small, there are a large number of almost spherical agglomerated particles, and the powder has a particle size distribution close to most dense filling. The above range cannot be attained by a hexagonal boron nitride powder containing single particles as the main component and is higher than that of a conventional hexagonal boron nitride powder containing agglomerated particles.

For practical application, when the above tap bulk density is lower than 0.66 g/cm$^3$ and a heat-conductive insulating sheet is produced, the filler is not in a most densely filled state in the sheet, whereby an excessive load is applied to hexagonal boron nitride agglomerates at the time of press molding with the result that the agglomerates are broken and it is difficult to achieve high heat conductivity. As the tap bulk density is higher, the above effect is more easily obtained. However, it is difficult to produce a hexagonal boron nitride powder having a tap bulk density of more than 0.95 g/cm$^3$.

It is essential that the DBP absorption rate, maximum torque and tap bulk density of the hexagonal boron nitride powder of the present invention should fall within the above ranges at the same time. A hexagonal boron nitride powder having such a small DBP absorption rate, maximum torque and high tap bulk density has not been proposed before and is first proposed in the present invention.

The specific surface area of the hexagonal boron nitride powder of the present invention is preferably 1.31 to 7.0 m$^2$/g, more preferably 1.61 to 6.0 m$^2$/g, much more preferably 2.0 to 5.0 m$^2$/g. Since a hexagonal boron nitride powder having a specific surface area larger than 7.0 m$^2$/g contains a large number of fine particles, it causes heat resistance in a heat conductive insulating sheet and is not preferred from the viewpoint of handling properties such as the swirling of the powder. Meanwhile, in a hexagonal boron nitride powder having a specific surface area of not more than 1.31 m$^2$/g, the content of hexagonal boron nitride single particles increases, and the tap bulk density deviates from the range of the present invention disadvantageously.

In the present invention, the specific surface area of the hexagonal boron nitride powder is measured by a BET 1-point method as shown in Examples which will be given hereinafter and can be checked, for example, with the Macsorb HM model-1201 (trade name) of Mountech Co., Ltd.

Since the hexagonal boron nitride powder of the present invention contains hexagonal boron nitride agglomerates, the particle diameter (D1) at a cumulative volume frequency of 90% in particle size distribution measured by a wet laser diffraction particle size distribution method is preferably 50 to 150 μm, more preferably 60 to 140 μm, much more preferably 65 to 120 μm. When (D1) is smaller than 50 μm, it is difficult to achieve high heat conductivity and when (D1) is larger than 150 μm, the particle diameter becomes too large disadvantageously as compared with the thickness of a radiation insulating sheet which has been becoming thinner in recent years.

The particle size distribution of the above hexagonal boron nitride powder is measured by a wet laser diffraction particle size distribution method as shown in Examples which will be given hereinafter and can be checked, for example, with the LA-950V2 (trade name) of HORIBA Ltd.

Since it is difficult to confirm the shape of each particle in the wet laser diffraction particle size distribution, it is difficult to judge whether the hexagonal boron nitride powder contains flaky single particles or agglomerates. If necessary, it is possible to confirm that particles having a particle diameter of not less than 50 μm are hexagonal boron nitride agglomerates by SEM (Scanning Electron Microscope) observation. However, it is unconceivable that flaky single particles having a particle diameter of not less than 50 μm are highly selectively produced in the production process of the present invention, and it can be said that particles on a large-diameter side in the particle size distribution are agglomerates. If flaky single particles having a particle diameter of not less than 50 μm are highly selectively contained, the DBP absorption rate may fall within the above range but the tap bulk density does not fall within the above range. It can be said from this that, when the maximum torque, the DBP absorption rate and the tap bulk density fall within the above ranges specified in the present invention, hexagonal boron nitride agglomerates are contained.

In the present invention, the purity of the hexagonal boron nitride powder is measured by a fluorescent X-ray analyzing method as shown in Examples which will be given hereinafter and can be confirmed, for example, by using the ZSX Primus2 (trade name) of Rigaku Corporation as a fluorescent X-ray analyzing apparatus.

The boron nitride purity of the hexagonal boron nitride powder of the present invention is preferably not less than 99.95 mass %, more preferably not less than 99.97 mass %. The above purity cannot be attained by a granule or composite containing an organic or inorganic binder. When the hexagonal boron nitride powder has a purity of less than 99.95 mass %, the curing of a resin is hindered by impurities disadvantageously, which causes the reduction of heat conductivity and dielectric strength. The purity of the hexagonal boron nitride powder is a value obtained by subtracting the total content of impurity elements except for B and N out of the measurement elements of the hexagonal boron nitride powder measured by the above fluorescent X-ray analyzing method from 100.

(Process for Producing a Boron Nitride Powder)

Although the process for producing the hexagonal boron nitride powder of the present invention is not particularly limited, a typical production process therefor is as follows. This process comprises the steps of mixing together an oxygen-containing boron compound, a carbon source, an oxygen-containing calcium compound and boron carbide to ensure that the B/C ratio (elemental ratio) of B contained in the oxygen-containing boron compound to C contained in the carbon source becomes 0.75 to 1.05, the amount of the oxygen-containing calcium compound becomes 5 to 20 parts by mass in terms of CaO based on 100 parts by mass of the total in terms of $B_2O_3$ of the oxygen-containing boron compound and C of the carbon source, and the amount of the boron carbide becomes 10 to 45 parts by mass based on 100 parts by mass of the total in terms of $B_2O_3$, C and CaO of the oxygen-containing boron compound, the carbon source and the oxygen-containing calcium compound, respectively, and heating the mixture in a nitrogen atmosphere at 1,700 to 2,100° C. to reduction nitride it. After the reaction, a by-product except for boron nitride existent in the reaction product is preferably removed by acid cleaning.

(Raw Materials)

The biggest feature of the production process of the present invention is that the oxygen-containing boron compound, carbon source, oxygen-containing calcium compound and boron carbide are used as raw materials and mixed together in a predetermined ratio as will be described hereinafter. The functions and roles of the raw materials are described below.

(Oxygen-Containing Boron Compound)

In the above production process of the present invention, as the oxygen-containing boron compound which is one of the raw materials, a compound containing boron and oxygen atoms is used. Examples of the compound include boric acid, boric anhydride, metaboric acid, perboric acid, hypoboric acid, sodium tetraborate and sodium perborate. Out of these, boric acid and boron oxide which are easily acquired are preferably used. The average particle diameter of the oxygen-containing boron compound in use is preferably 30 to 800 μm, more preferably 50 to 700 μm, much more preferably 100 to 500 μm from the viewpoints of operability and the control of a reduction reaction. Although an oxygen-containing boron compound having an average particle diameter of more than 30 μm is easy to handle, a reduction reaction of an oxygen-containing boron compound having an average particle diameter of more than 800 μm may hardly proceed.

(Oxygen-Containing Calcium Compound)

The oxygen-containing calcium compound forms a composite oxide with the oxygen-containing boron compound to form a composite oxide having a high melting point, thereby preventing the volatilization of the oxygen-containing boron compound. It is also confirmed that the compound serves as a catalyst in a reaction (2) for nitriding boron carbide directly.

In the production process of the present invention, as the oxygen-containing calcium compound which is used as a catalyst and volatilization inhibitor for the oxygen-containing boron compound, an oxygen-containing calcium compound containing oxygen and calcium is preferably used. Examples of the oxygen-containing calcium compound include calcium carbonate, calcium hydrogen carbonate, calcium hydroxide, calcium oxide, calcium nitrate, calcium sulfate, calcium phosphate and calcium oxalate. They may be used alone or in combination of two or more. Out of these, calcium oxide and calcium carbonate are preferably used.

The average particle diameter of the above oxygen-containing calcium compound is preferably 0.01 to 200 μm, more preferably 0.05 to 120 μm, particularly preferably 0.1 to 80 μm.

(Carbon Source)

In the production process of the present invention, a known carbon material which functions as a reducing agent is used as the carbon source. Examples of the carbon material include amorphous carbons such as carbon black, activated carbon and carbon fibers, crystalline carbons such as diamond, graphite and nanocarbon, and thermally decomposed carbons obtained by thermally decomposing a monomer or a polymer. Out of these, amorphous carbons having high reactivity are preferred, and carbon black is particularly preferably used as its quality is industrially controlled. Examples of the carbon black include acetylene black, furnace black and thermal black. The average particle diameter of the above carbon source is preferably 0.01 to 5 μm, more preferably 0.02 to 4 μm, particularly preferably 0.05 to 3 μm. That is, when the average particle diameter of the carbon source is set to not more than 5 μm, the reactivity of the carbon source becomes high and when the average particle diameter is set to not less than 0.01 μm, the carbon source becomes easy to handle.

(Boron Carbide)

In the production process of the present invention, as the boron carbide which is used as a raw material B source for agglomerates, known boron carbon is used.

The average particle diameter of the above boron carbide is preferably 30 to 250 μm, more preferably 50 to 180 μm, particularly preferably 70 to 150 μm. That is, when the average particle diameter of the boron carbide is set to not more than 250 μm, the formation of coarse agglomerates is suppressed and when the average particle diameter is set to not less than 30 μm, it is easy to produce agglomerates having a suitable particle diameter for securing high heat conductivity.

In the production process of the present invention, the supply form of the mixture containing the above raw materials to a reaction may be, for example, powdery as it is or granular.

In the production process of the present invention, the above raw materials may be mixed together by using a mixer such as a vibration mill, bead mill, ball mill, Henschel mixer, drum mixer, vibration stirrer or twin-cylinder mixer.

The mixture may be granulated, for example, by extrusion granulation, rolling granulation or granulation with a compactor using a binder as required. In this case, the size of each granule is preferably 5 to 10 mm.

(Preparation of Raw Materials)

In the present invention, although the reduction nitriding reaction is carried out by supplying the carbon source and nitrogen, to obtain the hexagonal boron nitride agglomerates of interest effectively, the B/C ratio (elemental ratio) of B contained in the oxygen-containing boron compound to C contained in the carbon source must be set to 0.75 to 1.05, preferably 0.75 to 0.95. When the elemental ratio is higher than 1.05, the amount of the boron compound which is volatilized without being reduced increases, whereby the yield is reduced and the production line is adversely affected by the above volatilized component. When the elemental ratio is lower than 0.75, the amount of unreacted boron oxide becomes small, thereby making it difficult to produce the hexagonal boron nitride agglomerates of interest when the reduction nitriding temperature is reached.

In the present invention, to obtain the hexagonal boron nitride agglomerates of interest effectively, it is necessary to mix 5 to 20 parts by mass in terms of CaO of the oxygen-containing calcium compound based on 100 parts by mass of the total in terms of $B_2O_3$ of the oxygen-containing boron compound and C of the carbon source. When the amount in terms of CaO is smaller than 5 parts by mass, the amount of the boron compound which is volatilized without being reduced increases, whereby the yield is reduced and the production line is adversely affected by the above volatilized component disadvantageously. When the amount in terms of CaO becomes larger than 20 parts by mass, an impurity derived from calcium may remain and hexagonal boron nitride particles hardly grow disadvantageously.

In the present invention, to obtain a hexagonal boron nitride powder of interest effectively, it is important that the above boron carbide should be mixed in an amount of 10 to 45 parts by mass based on 100 parts by mass of the total in terms of $B_2O_3$, C and CaO of the oxygen-containing boron compound, the carbon source and the boron carbide, respectively. That is, when the amount of the boron carbide is smaller than 10 parts by mass, the content of the hexagonal boron nitride agglomerates of interest lowers, thereby making it impossible to obtain the targeted DBP absorption rate and tap bulk density disadvantageously. When the amount of the above boron carbide is larger than 45 parts by mass, unreacted boron carbide may remain disadvantageously.

(Reduction Nitridation)

In the process for producing the hexagonal boron nitride powder of the present invention, the supply of a nitrogen source into a reaction system may be carried out by known means. For example, it is most preferred to circulate a nitrogen gas in the reaction system of a reactor whose examples will be given hereinafter. As the nitrogen source in use, not only the nitrogen gas but also any gas which is able to nitride in the reduction nitriding reaction is acceptable. Stated more specifically, an ammonia gas may be used besides the above nitrogen gas. A mixed gas prepared by mixing a non-oxidizing gas such as hydrogen, argon or helium with a nitrogen gas or ammonia gas may also be used.

In the above production process, to obtain a hexagonal boron nitride powder having high crystallinity, it is important that the heating temperature in the reduction nitriding reaction should be 1,700 to 2,100° C., preferably 1, 800 to 2, 100° C., much more preferably 1, 900 to 2,000° C. That is, when the temperature is lower than 1,700° C., the reduction nitriding reaction does not proceed, thereby making it difficult to obtain hexagonal boron nitride having high crystallinity and when the temperature is higher than 2,100° C., the effect reaches the ceiling, which is economically disadvantageous.

The time for the reduction nitriding reaction is suitable determined, for example, 10 to 30 hours.

The process for producing the hexagonal boron nitride powder of the present invention can be carried out by using a known reactor which enables the control of a reaction atmosphere. For example, an atmosphere control-type high-temperature furnace which carries out a heat treatment with high-frequency induction heating or heater, batch furnace and continuous heating furnaces such as pusher-type tunnel furnace and vertical reaction furnace may be used.

(Acid Cleaning)

In the production process of the present invention, since the reaction product obtained by the above-described reduction nitridation contains impurities such as composite oxide of boron oxide and calcium oxide besides the hexagonal boron nitride powder, acid cleaning is preferably carried out. The acid cleaning method is not particularly limited and any known method may be employed. For example, by-product-containing boron nitride obtained after nitridation is crushed and injected into a container and diluted hydrochloric acid (10 to 20 mass % of HCl) is added in an amount 5 to 10 times larger than the amount of the hexagonal boron nitride powder containing the impurities and brought into contact with the powder for 4 to 8 hours.

As the acid used for the above acid cleaning, nitric acid, sulfuric acid or acetic acid may be used besides hydrochloric acid.

After the above acid cleaning, pure water is used to clean off the remaining acid. As for the above cleaning method, the acid used for the above acid cleaning is filtered, and boron nitride which has been acid cleaned is dispersed in the same amount of pure water as the amount of the acid in use and filtered again.

(Drying)

As for drying conditions for drying a water-containing block object after acid cleaning and aqueous cleaning, drying in the air having a temperature of 50 to 250° C. or under reduced pressure is preferred. The drying time is not particularly limited but preferably such that the moisture content becomes as close to 0% as possible.

(Classification)

After the dried boron nitride powder is crushed, the removal of coarse particles with a sieve or the removal of fine powders by airflow classification may be carried out as required.

(Use of Boron Nitride Powder)

The hexagonal boron nitride powder of the present invention can be used for various known purposes without restriction. As for preferred use, it is used for resins as a filler to improve electric insulation property or provide heat conductivity. In the use of the above boron nitride powder, the obtained resin composition has high electric insulation property and heat conductivity.

The resin composition of the present invention can be used for various purposes. When it is mixed with a resin which will be described hereinafter to forma heat-conductive resin composition or heat-conductive molding, the composition or molding can be advantageously used as a thermal interface material such as polymer-based heat conductive insulating sheet or phase change sheet, organic heat conductive insulating sheet such as radiation tape, radiation grease, radiation adhesive or gap filler, radiation paint such as radiation paint or radiation coat, radiation resin substrate such as PWB base resin substrate or CCL base resin substrate, insulation layer for metal base substrates such as aluminum base substrates and copper base substrates, and sealing material for power devices.

When the hexagonal boron nitride powder of the present invention is used to prepare a resin composition, it may be mixed with a known highly heat-conductive insulation filler such as aluminum nitride or aluminum oxide.

Examples of the above resin include thermoplastic resins such as polyolefins, vinyl chloride resin, methyl methacrylate resin, nylon and fluororesin, thermosetting resins such as epoxy resin, phenol resin, urea resin, melamine resin, unsaturated polyester resin, silicon resin and bismaleimide triazine resin, and synthetic rubbers.

The above resin composition may comprise known additives such as polymerization initiator, curing agent, polymerization inhibitor, polymerization-delaying agent, coupling agent, plasticizer, ultraviolet absorbent, pigment, dye, antibacterial agent, organic filler and organic-inorganic composite filler as a compounding agent for resin compositions as required. Another inorganic filler may be contained as long as the effect of the present invention is not damaged.

The hexagonal boron nitride powder of the present invention may also be used as a raw material for boron nitride processed products such as cubic boron nitride or boron nitride molded articles, nucleating agent for engineering plastics, phase change material, solid or liquid thermal interface material, release agent for molten metal or molten glass molds, and cosmetic and composite ceramic raw material.

EXAMPLES

The following examples are provided for the purpose of further illustrating the present invention but are in no way to be taken as limiting.

In the examples, measurement values were obtained by the following methods.

[DBP Absorption Rate (Ml/100 g) and Maximum Torque (Nm) of Hexagonal Boron Nitride Powder Based on JIS-K-6217-4]

The maximum torque (Nm) and DBP absorption rate (ml/100 g) calculated from a curve plotting the DBP dropping amount (ml) on the horizontal axis and torque (Nm) on the vertical axis measured in accordance with JIS-K-6217-4 of the obtained hexagonal boron nitride powder were obtained. The S-500 measurement instrument of Asahi-souken Corporation was used. The dropping amount of DBP at a torque of 70% of the maximum torque under measurement conditions which included a DBP dropping rate of 4 ml/min, a stirring blade revolution of 125 rpm and a sample input amount of 30 g was taken as the DBP absorption rate. As DBP (dibutyl phthalate), a guaranteed reagent (sales original code 021-06936) manufactured by Wako Pure Chemical Industries, Ltd. was used.

[Tap Bulk Density (g/Cm$^3$) of Hexagonal Boron Nitride Powder]

The tap bulk density of 100 ml of the obtained hexagonal boron nitride powder was measured by using the Tap Denser KYT-5000 of Seishin Enterprise Co., Ltd. The amount of a sample cell was 100 ml, the tap rate was 120 times/min, the tap height was 5 cm, and the number of taps was 500. The sample cell was a cylinder with a lid having a diameter of 28 mm and a height of 163 mm.

[Specific Surface Area (m$^2$/g) of Hexagonal Boron Nitride Powder]

The specific surface area of the obtained hexagonal boron nitride powder was measured by using the Macsorb HM model-1201 of Mountech Co., Ltd.

[Particle Diameter D1 (μm) at Cumulative Volume Frequency of 90% in Particle Size Distribution of Hexagonal Boron Nitride Powder]

The particle diameter (D1) at a cumulative volume frequency of 90% in the particle size distribution of the obtained hexagonal boron nitride powder was measured by using the LA-950V2 of Horiba, Ltd. The boron nitride powder was dispersed in an ethanol solvent to measure the particle diameter (D1) without carrying out an operation which may destroy boron nitride agglomerated particles such as ultrasonic treatment. The particle diameter at a cumulative volume frequency of 90% in the obtained particle size distribution was taken as (D1).

[Purity (Mass %) of Hexagonal Boron Nitride Powder]

The purity of the obtained hexagonal boron nitride powder was measured by using the ZSX Primus2 (trade name) of Rigaku Corporation. The purity of the hexagonal boron nitride powder is a value obtained by subtracting the total content of impurity elements except for B and N out of the measurement elements of the hexagonal boron nitride powder measured by the above fluorescent X-ray analyzing method from 100.

Example 1

351.7 g of a mixture containing 195 g of boron oxide, 83 g of carbon black, 25.2 g of calcium oxide and 48.5 g of boron carbide having an average particle diameter of 170 μm was mixed by using a ball mill. The (B/C) elemental ratio of the mixture was 0.81, and the amount in terms of CaO of the above oxygen-containing calcium compound was 9.1 parts by mass based on 100 parts by mass of the total in terms of $B_2O_3$ and C of the oxygen-containing boron compound and the carbon source, respectively. The amount of the boron carbide was 16 parts by mass based on 100 parts by mass of the total in terms of $B_2O_3$, C and CaO of the oxygen-containing boron compound, carbon source and oxygen-containing calcium compound, respectively. 100 g of the mixture was kept in a nitrogen gas atmosphere at 1,950° C. for 17 hours by using a graphite Tannmann furnace to be nitrided.

Then, the by-product-containing boron nitride was crushed and injected into a container, and hydrochloric acid (7 mass % of HCl) was added in an amount 5 times larger than that of the by-product-containing boron nitride and stirred at a revolution of 700 rpm for 24 hours. After acid cleaning, the acid was filtered and boron nitride obtained by filtration was dispersed in the same amount of pure water as that of the acid used and filtered again. After this operation was repeated 5 times, the obtained product was vacuum dried at 200° C. for 6 hours.

The powder obtained after drying was put through a sieve having an opening of 120 μm to obtain a white hexagonal boron nitride powder. The DBP absorption rate, maximum torque, tap bulk density, specific surface area, purity and particle diameter D1 at a cumulative volume frequency of 90% in particle size distribution of the obtained hexagonal boron nitride powder were measured by the above methods and shown in Table 2.

Example 2

The procedure of Example 1 was repeated except that the amount of the boron carbide was changed to 20 parts by mass based on 100 parts by mass of the total in terms of $B_2O_3$, C and CaO of the oxygen-containing boron compound, the carbon source and the oxygen-containing calcium compound, respectively. The conditions and measurement values are shown in Tables 1 and 2.

Example 3

The procedure of Example 1 was repeated except that the amount of the oxygen-containing calcium compound was changed to 11.1 parts by mass in terms of CaO based on 100 parts by mass of the total in terms of $B_2O_3$ and C of the oxygen-containing boron compound and the carbon source, respectively. The conditions and measurement values are shown in Tables 1 and 2.

Example 4

The procedure of Example 1 was repeated except that the amount of the boron carbide was changed to 10 parts by mass based on 100 parts by mass of the total in terms of $B_2O_3$, C and CaO of the oxygen-containing boron compound, the carbon source and the oxygen-containing calcium compound, respectively, and the reduction nitriding temperature was changed to 1,900° C. The conditions and measurement values are shown in Tables 1 and 2.

Example 5

The procedure of Example 1 was repeated except that the (B/C) elemental ratio was changed to 0.80, the amount of the boron carbide was changed to 23 parts by mass based on 100 parts by mass of the total in terms of $B_2O_3$, C and CaO of the oxygen-containing boron compound, the carbon source and the oxygen-containing calcium compound, respectively, and the reduction nitriding temperature was changed to 2,000° C. The conditions and measurement values are shown in Tables 1 and 2.

Example 6

The procedure of Example 1 was repeated except that the (B/C) elemental ratio was changed to 0.79, the amount of oxygen-containing calcium compound was changed to 11.1 parts by mass in terms of CaO based on 100 parts by mass of the total in terms of $B_2O_3$ and C of the oxygen-containing boron compound and the carbon source, respectively, and the amount of boron carbide was changed to 17.5 parts by mass based on 100 parts by mass of the total in terms of $B_2O_3$, C and CaO of the oxygen-containing boron compound, the carbon source and the oxygen-containing calcium compound, respectively. The conditions and measurement values are shown in Tables 1 and 2.

Comparative Example 1

The procedure of Example 1 was repeated except that boron carbide was not added. The conditions and measurement values are shown in Tables 1 and 2.

Comparative Example 2

The physical properties of a commercially available hexagonal boron nitride powder which contains hexagonal boron nitride agglomerated particles highly selectively (PTX25 (trade name) of Momentive) were measured and shown in Table 2.

Comparative Example 3

The physical properties of a commercially available hexagonal boron nitride powder which contains hexagonal boron nitride single particles highly selectively (PT110 (trade name) of Momentive) were measured and shown in Table 2.

Examples 7 to 12

Resin compositions were produced by filling an epoxy resin with the hexagonal boron nitride powders obtained in Examples 1 to 6 to evaluate heat conductivity. A varnish-like mixture of 100 parts by mass of an epoxy resin (JER828 of Mitsubishi Chemical Corporation), 5 parts by mass of a curing agent (imidazole-based curing agent, CUREZOL 2E4MZ of Shikoku Chemicals Corporation) and 210 parts by mass of methyl ethyl ketone as a solvent was prepared. Then, the above varnish-like mixture and each of the above hexagonal boron nitride powders were mixed together by means of a revolving/rotating mixer (MAZERUSTAR of Kurabo Industries Ltd.) to ensure that the amount of the base epoxy resin became 30 vol % and the amount of the above hexagonal boron nitride power became 70 vol % so as to obtain a resin composition.

The above resin composition was applied to a PET film to a thickness of 250 to 300 μm by using the PI-1210 automatic coating machine of Tester Sangyo Co., Ltd., dried and cured under reduced pressure at a temperature of 200° C. and a pressure of 5 MPa for a retention time of 30 minutes to produce a sheet having a thickness of 200 μm. This sheet was analyzed by a temperature wave heat analyzer to calculate its heat conductivity which is shown in Table 3. The heat conductivities of the sheets manufactured by filling the hexagonal boron nitride powders produced in Examples 1 to 5 were high at not less than 14.0 W/mK. The dielectric strengths measured with a withstand voltage tester (manufactured by Tamadensoku Co., Ltd.) were high at not less than 40 kV/mm, which suggested that the number of voids causing the reduction of dielectric strength was small in the resin composition. 80 vol % of each base epoxy resin and 20 vol % of the above hexagonal boron nitride powder were mixed together in a mortar under the same conditions for each test and measured for viscosity with the B type viscometer TBA-10 (manufactured by Toki Sangyo Co., Ltd.) at a measurement temperature of 25° C. The results are shown in Table 3.

Example 13

A sheet was manufactured and the viscosity was evaluated in the same manner as in Example 7 except that the hexagonal boron nitride powder produced in Example 1, aluminum nitride having an average particle diameter of 30 μm and aluminum oxide having an average particle diameter of 1 μm were mixed together in a volume ratio of 5:4:1. The results are shown in Table 3.

Example 14

A sheet was manufactured and the viscosity was evaluated in the same manner as in Example 7 except that the hexagonal boron nitride powder produced in Example 1 and aluminum nitride having an average particle diameter of 30 μm were mixed together in a volume ratio of 5:5. The results are shown in Table 3.

Example 15

A sheet was manufactured and the viscosity was evaluated in the same manner as in Example 7 except that the hexagonal boron nitride powder produced in Example 4 and aluminum oxide having an average particle diameter of 20 μm were mixed together in a volume ratio of 9.5:0.5. The results are shown in Table 3.

Comparative Examples 4 to 6

The procedure of Example 7 was repeated except that the hexagonal boron nitride powder obtained in Comparative Example 1 and the commercially available hexagonal boron nitride powder of Comparative Example 3 were used to manufacture sheets as Comparative Examples 4 and 6. In Comparative Example 5 in which the commercially available hexagonal boron nitride powder of Comparative Example 2 was used, the DBP absorption rate was large and the amount of the solvent required to achieve viscosity enabling coating was 320 parts by mass which was much larger than other Examples and Comparative Examples. When the cross sections of the inside parts of the sheets were observed, a large number of voids were seen. The sheets were analyzed with a temperature wave heat analyzer to calculate their heat conductivities which are shown in Table 3. The results of dielectric strength measured with a withstand voltage tester (manufactured by Tamadensoku Co., Ltd.) are shown in Table 3. The sheets obtained by filling the hexagonal boron nitride powder obtained in Comparative Example 1 and the commercially available hexagonal boron nitride powders of Comparative Examples 2 and 3 could not achieve a dielectric strength of 14.0 W/mK. The sheets of Comparative Examples 2 and 3 could not achieve a dielectric strength of not less than 40 kV/mm.

Subsequently, 80 vol % of the base resin and 20 vol % of the above specific boron nitride powder were mixed together in a mortar under the same conditions for each test to measure the viscosity of the obtained mixture with the B type viscometer TBA-10 (manufactured by Toki Sangyo Co., Ltd.) at a measurement temperature of 25° C. Resin compositions comprising the hexagonal boron nitride powder obtained in Comparative Example 1 and the commercially available hexagonal boron nitride powders of Comparative Examples 2 and 3 had higher viscosity than the resin compositions comprising hexagonal boron nitride powders obtained in Examples 1 to 6.

TABLE 1

|  | B/C ratio*1 | parts by mass in terms of CaO*2 | parts by mass of B₄C*3 | reduction nitridation temperature |
| --- | --- | --- | --- | --- |
| Example 1 | 0.81 | 9.1 | 16 | 1950 |
| Example 2 | 0.81 | 9.1 | 20 | 1950 |
| Example 3 | 0.81 | 11.1 | 16 | 1950 |
| Example 4 | 0.81 | 9.1 | 10 | 1900 |
| Example 5 | 0.80 | 9.1 | 23 | 2000 |
| Example 6 | 0.79 | 11.1 | 17.5 | 1950 |
| Comparative Example 1 | 0.81 | 9.1 | 0 | 1950 |

*1B/C (elemental ratio): Ratio of B contained in oxygen-containing boron compound and carbon source to carbon
*2Amount of oxygen-containing calcium compound in terms of CaO based on 100 parts by mass of the total in terms of B₂O₃ of oxygen-containing boron compound and C of carbon source
*3parts by mass of B₄C based on 100 parts by mass of the total in terms of B₂O₃, C and CaO of oxygen-containing boron compound, carbon source and oxygen-containing calcium compound, respectively

TABLE 2

|  | DBP absorption rate (ml/100 g) | maximum torque (Nm) | tap bulk density (g/cm³) | specific surface area (m²/g) | purity of hexagonal boron nitride powder (mass %) | D1 (μm) |
| --- | --- | --- | --- | --- | --- | --- |
| Example 1 | 77 | 0.35 | 0.83 | 1.65 | 99.99 | 65 |
| Example 2 | 62 | 0.44 | 0.90 | 4.05 | 99.99 | 100 |
| Example 3 | 96 | 0.29 | 0.69 | 2.20 | 99.99 | 110 |
| Example 4 | 88 | 0.49 | 0.74 | 1.65 | 99.99 | 110 |
| Example 5 | 76 | 0.32 | 0.86 | 5.53 | 99.99 | 115 |
| Example 6 | 81 | 0.28 | 0.83 | 2.82 | 99.99 | 90 |
| Comparative Example 1 | 87 | 0.67 | 0.55 | 1.10 | 99.99 | 25 |
| Comparative Example 2 | 133 | 0.55 | 0.30 | 5.50 | 99.99 | 90 |
| Comparative Example 3 | 68 | 0.22 | 0.63 | 0.60 | 99.70 | 100 |

TABLE 3

|  | Hexagonal boron nitride powder | heat conductivity (W/m · K) | dielectric strength (KV/mm) | Viscosity (Pa · s) |
| --- | --- | --- | --- | --- |
| Example 7 | Example 1 | 15.8 | 44.3 | 14.2 |
| Example 8 | Example 2 | 14.7 | 43.2 | 12.8 |
| Example 9 | Example 3 | 14.2 | 41.9 | 19.2 |
| Example 10 | Example 4 | 14.8 | 42.0 | 18.2 |
| Example 11 | Example 5 | 16.8 | 40.4 | 19.2 |
| Example 12 | Example 6 | 15.3 | 43.7 | 17.8 |
| Example 13 | Example 1 | 17.2 | 43.2 | 16.2 |
| Example 14 | Example 1 | 17.6 | 41.9 | 16.3 |
| Example 15 | Example 4 | 14.2 | 44.2 | 13.8 |
| Comparative Example 4 | Comparative Example 1 | 9.2 | 44.3 | 29.2 |
| Comparative Example 5 | Comparative Example 2 | 11.8 | 25.5 | 210.2 |
| Comparative Example 6 | Comparative Example 3 | 9.8 | 39.8 | 28.3 |

The invention claimed is:

1. A hexagonal boron nitride powder containing hexagonal boron nitride agglomerates and having a maximum torque of 0.20 to 0.50 Nm, a DBP absorption rate of 50 to 100 ml/100 g and a tap bulk density of 0.66 to 0.95 g/cm³, wherein the maximum torque and the DBP absorption rate are calculated by measuring in accordance with J1S-K-6217-4.

2. The hexagonal boron nitride powder according to claim 1, wherein the specific surface area is 1.31 to 7.0 m²/g.

3. The hexagonal boron nitride powder according to claim 1, wherein the particle diameter at a cumulative volume frequency of 90% in particle size distribution measured by a wet laser diffraction particle size distribution method is 50 to 150 μm.

4. The hexagonal boron nitride powder according to claim 1, wherein the purity of boron nitride is not less than 99.95 mass %.

5. The hexagonal boron nitride powder according to claim 2, wherein the particle diameter at a cumulative volume frequency of 90% in particle size distribution measured by a wet laser diffraction particle size distribution method is 50 to 150 μm.

6. The hexagonal boron nitride powder according to claim 2, wherein the purity of boron nitride is not less than 99.95 mass %.

7. The hexagonal boron nitride powder according to claim 3, wherein the purity of boron nitride is not less than 99.95 mass %.

8. A process for producing the hexagonal boron nitride powder of claim 1, comprising the steps of:
mixing together an oxygen-containing boron compound, a carbon source, an oxygen-containing calcium compound and boron carbide to ensure that the BIC ratio (elemental ratio) of B contained in the oxygen-containing boron compound to C contained in the carbon source becomes 0.75 to 1.05, the amount of the oxygen-containing calcium compound becomes 5 to 20 parts by mass in terms of CaO based on 100 parts by mass of the total in terms of B₂O₃ of the oxygen-containing boron compound and C of the carbon source, and the amount of the boron carbide becomes 10 to 45 parts by mass based on 100 parts by mass of the total in terms of B₂O₃, C and CaO of the oxygen-containing boron compound, the carbon source and the oxygen-containing calcium compound, respectively; and
heating the mixture in a nitrogen atmosphere at 1,700 to 2,100° C. to reduction nitride it.

* * * * *